(12) United States Patent
Brendel et al.

(10) Patent No.: US 9,556,803 B2
(45) Date of Patent: Jan. 31, 2017

(54) INTERNAL COMBUSTION ENGINE

(71) Applicant: Audi AG, Ingolstadt (DE)

(72) Inventors: Matthias Brendel, Ingolstadt (DE); Markus Meyer, Mildenau (DE)

(73) Assignee: AUDI AG, Ingolstadt (DE)

( * ) Notice: Subject to any disclaimer, the term of this patent is extended or adjusted under 35 U.S.C. 154(b) by 149 days.

(21) Appl. No.: 14/406,118

(22) PCT Filed: Apr. 11, 2013

(86) PCT No.: PCT/EP2013/001061
§ 371 (c)(1),
(2) Date: Dec. 5, 2014

(87) PCT Pub. No.: WO2013/152857
PCT Pub. Date: Oct. 17, 2013

(65) Prior Publication Data
US 2015/0330314 A1    Nov. 19, 2015

(30) Foreign Application Priority Data

Apr. 13, 2012 (DE) .......................... 10 2012 007 465

(51) Int. Cl.
*F02D 15/02* (2006.01)
*F16J 7/00* (2006.01)
*F02B 75/04* (2006.01)

(52) U.S. Cl.
CPC ............. *F02D 15/02* (2013.01); *F02B 75/048* (2013.01); *F16J 7/00* (2013.01)

(58) Field of Classification Search
CPC ..... F02B 75/048; F02B 75/045; F02B 75/047; F02B 75/32; F02B 75/044; F02D 15/02; F02D 15/00

USPC ............... 123/48 B, 48 A, 48 R, 78 R, 78 A, 7 BA,123/78 E, 78 F, 193.1, 193.3
See application file for complete search history.

(56) References Cited

U.S. PATENT DOCUMENTS

| 4,917,066 | A | * | 4/1990 | Freudenstein | ............ | F01B 7/12 |
| | | | | | | 123/197.4 |
| 6,843,212 | B2 | * | 1/2005 | Shimizu | .................. | F02B 63/02 |
| | | | | | | 123/48 B |
| 6,971,342 | B1 | * | 12/2005 | Grabbe | ................. | F02B 75/047 |
| | | | | | | 123/48 B |

(Continued)

FOREIGN PATENT DOCUMENTS

DE    44 37 132    5/1995
DE    601 09 342    8/2005

(Continued)

*Primary Examiner* — Long T Tran
(74) *Attorney, Agent, or Firm* — Henry M. Feiereisen LLC

(57) ABSTRACT

An internal combustion engine includes a piston axially displaced in a cylinder over a maximal stroke and a connecting rod device for adjusting the compression of the internal combustion engine and having a transverse lever with one end connected by a first joint with a connecting rod articulately arranged in the piston and another end connected by a second joint with an actuatable control lever pivotal about a third joint. The transverse lever is connected between the first joint and the second joint by a fourth joint with a crankpin of the crankshaft which is spaced apart from a rotation axis of the crankshaft, wherein a lateral distance between the rotation axis of the crankshaft and the third joint in relation to the maximal stroke of the piston is at least −1.0.

9 Claims, 3 Drawing Sheets

(56) References Cited

U.S. PATENT DOCUMENTS

| | | | |
|---|---|---|---|
| 2002/0026910 A1* | 3/2002 | Hiyoshi | F02B 75/045 |
| | | | 123/48 B |
| 2003/0200942 A1 | 10/2003 | Dachtchenko et al. | |
| 2008/0173281 A1 | 7/2008 | Jurging et al. | |
| 2008/0283027 A1 | 11/2008 | Meintschel et al. | |
| 2009/0000598 A1 | 1/2009 | Bach et al. | |
| 2009/0159051 A1* | 6/2009 | Venturi | F02B 75/048 |
| | | | 123/48 B |
| 2010/0050992 A1* | 3/2010 | Nakanishi | F02D 15/02 |
| | | | 123/48 B |
| 2012/0285412 A1 | 11/2012 | Brendel et al. | |
| 2013/0118442 A1 | 5/2013 | Brendel | |

FOREIGN PATENT DOCUMENTS

| | | |
|---|---|---|
| DE | 102005020270 | 11/2006 |
| DE | 102005047203 | 4/2007 |
| DE | 102010004589 | 7/2011 |
| EP | 1347160 | 9/2003 |
| FR | 2 802 973 | 6/2001 |
| JP | 09-228858 | 9/1997 |
| WO | WO 02/12694 | 2/2002 |
| WO | WO 2007/057149 | 5/2007 |

* cited by examiner

INTERNAL COMBUSTION ENGINE

CROSS-REFERENCES TO RELATED APPLICATIONS

This application is the U.S. National Stage of International Application No. PCT/EP2013/001061, filed Apr. 11, 2013, which designated the United States and has been published as International Publication No. WO 2013/152857 and which claims the priority of German Patent Application, Serial No. 10 2012 007 465.4, filed Apr. 13, 2012, pursuant to 35 U.S.C. 119(a)-(d).

BACKGROUND OF THE INVENTION

The invention relates to an internal combustion engine, in particular for a motor vehicle with at least one piston which is supported in a cylinder so as to be displaceable over a maximal stroke, and with a connecting rod device for adjusting the compression of the internal combustion engine, wherein the connecting rod device has a transverse lever which on one of its ends is connected by a first joint with a connecting rod articulately arranged on the piston and on its other end is connected by a second joint with an actuatable control lever, wherein the control lever is arranged so a to be pivotal about a third joint, and wherein the transverse lever between the first joint and the second joint is connected by a third joint with a crankpin pin of the crankshaft which crankpin is situated spaced apart to a rotation axis of a crankshaft of the internal combustion engine.

Internal combustion engines of the aforementioned type are known form the state of the art, Thus for example the European patent document EP 1 307 642 B1 discloses an internal combustion engine with variable compression ratio, which has a connecting rod device with which it is possible to adjust the compression of the internal combustion engine during operation. for this a transverse lever is provided whose one end is displaceable by means of the control lever in its position, and whose other end is connected with the connecting rod of the piston. The crankshaft which engages on the transverse lever between the connecting rod and the control lever performs the usual movement which leads to a translatory or oscillating displacement of the piston in the cylinder. By actuating the control lever the angular relationships are changed so that the stroke of the piston in the cylinder changes thereby varying the compression or compression occurring in the cylinder. in the patent document nine parameters of the connecting rod device are defined with the goal to obtain the smallest load exerted on the individual members and with this an optimal smooth running. For this purpose different conditions for the distances of the different joints to each other are defined in relation to the crankshaft radius.

SUMMARY OF THE INVENTION

The invention is based on the object to further reduce the forces acting on the joints and with this the friction acting therewithin in order to reduce the mechanical losses of the internal combustion engine.

The object on which the invention is based is solved by an internal combustion engine including at least one piston axially displaceable in a cylinder over a maximal stroke; and a connecting rod device for adjusting a compression of the internal combustion engine, the connecting rod device comprising a transverse lever having opposing ends and being connected on one of the opposing ends to a connecting rod via a first joint, and on the other one of the opposing ends being connected via a second joint with an actuatable control lever, the connecting rod being articulately arranged in the piston the control lever being arranged pivotal about a third joint, the transverse lever being connected between the first joint and the second joint with a crankpin of the crankshaft via a fourth joint (P3), the crankpin being spaced apart from a rotation axis of the crankshaft, wherein a lateral distance between the rotation axis of the crankshaft and the third joint (P5) in relation to the maximal stroke of the piston is at least −1.0, in particular −1.23 or −1.78. It has the advantage that as a result of the particular arrangement of the joints, in particular the pivot joint of the control lever relative to the rotation axis of the crankshaft of the internal combustion engine the efficiency is overall improved. due to the great distance of the third joint to the rotation axis the pivot angles of the connecting rod device are reduced and as a result the friction reduced. According to the invention it is provided that the lateral distance between the rotation axis of the crankshaft and the third joint relative to the maximal stoke of the piston is at least −1.0, in particular −1.23 or 1.78. The lateral distance in this context refers to the distance between the pivot axis and the rotation axis, measured perpendicularly to the stroke axis of the cylinder piston. While the distance between the rotation axis and the stroke axis of the piston and between the first joint and the rotation axis is positive, the lateral distance between the rotation axis and the third joint which is located on the opposite side of the rotation axis has a negative value. the rotation axis is thus understood as cero point. due to the great distance of the third joint to the rotation axis the pivot angles are as previously mentioned reduced thereby reducing the friction which leads to a higher efficiency of the internal combustion engine.

Preferably the crankshaft radius, i.e., the distance of the rotation axis of the crankshaft to the eccentric rotation axis of the crankpin is in relation to the maxima) stroke of the piston at least 0.3, in particular 0.34 or 0.37.

According to an advantageous refinement of the invention it is provided that the horizontal distance or the offset between the rotation axis of the crankshaft and the third joint or its pivot axis relative to the maximal stroke of the piston is at least −0.6, in particular −0.65.

Preferably, the distance between the second joint and the third joint is in relation to the maximal stroke of the piston at least 1.2, in particular 1.27 or 1.74.

Further it is preferably provided that the distance between the second and the fourth joint in relation to the maximal stroke of the piston is at least 1.3 in particular 1.32 or 1.64.

In addition it is preferably provided that the distance between the first and the fourth joint in relation to the maximal stroke of the piston is at least 0.5, in particular 0.57 or 0.62.

It is further preferably provided that the distance between the piston (joint) and the first joint in relation to the maximal stroke of the piston is at least 1.5, in particular 1.57 or 1.75.

Preferably the angled portion, i.e. the lateral offset between the rotation axis of the crankshaft and the cylinder axis, in relation to the maximal stroke of the piston is at least 0.38 in particular 0.41 or 0.47.

It is further preferably provided that the maximal stroke of the piston is at least 84 mm, in particular 92.8 mm.

BRIEF DESCRIPTION OF THE DRAWING

In the following the invention is explained in more detail by way of the drawing. it is shown in.

DETAILED DESCRIPTION OF PREFERRED EMBODIMENTS

Figure 1:
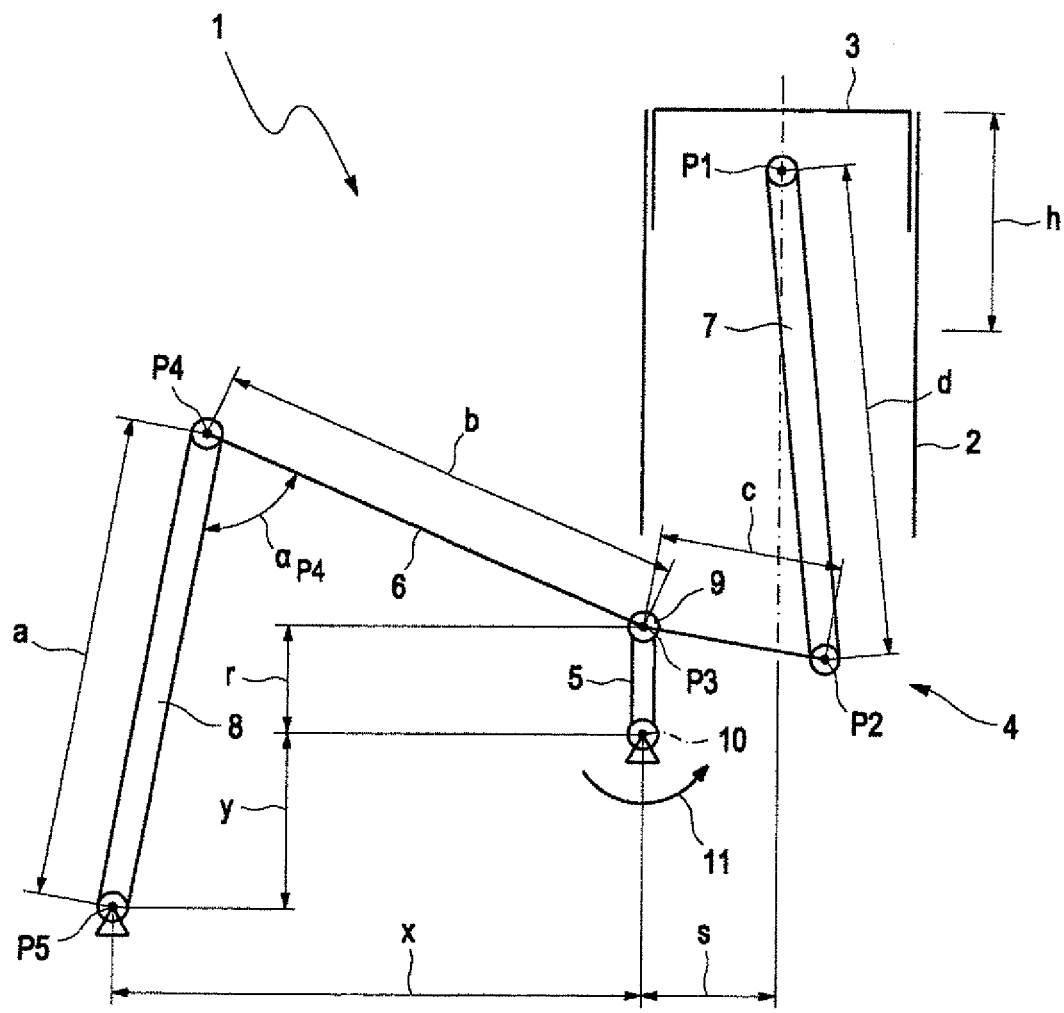
FIG. 1 an internal combustion engine with a connecting rod device for adjusting the compression in a simplified representation, FIG. 2 pivot angle courses of the connecting rod transmission according to a first exemplary embodiment, FIG. 3 pivot angle courses of the connecting rod transmission according to a second exemplary embodiment, FIG. 4 comparison of the pivot angle ranges of the exemplary embodiments and FIG. 5 a comparison of the friction moments occurring in the joints of both exemplary embodiments.

FIG. 1 shows a simplified representation of an internal combustion engine 1, which has a piston 3 which is axially displaceably supported in a cylinder 2. The piston 3 is connected with a crankshaft 5 of the internal combustion engine 1 via a connecting rod device 4 and can be displaced in the cylinder over a maximal stroke h.

The connecting rod device 4 includes a transverse lever 6, which is connected on one end by a first joint P2 to a connecting rod 7 which is connected to the piston 3 by a joint P1. On the other end the transverse lever 6 is connected by a second joint P4 to a control lever 8. The control lever 8 is pivotally held by a third joint P5 at a distance to the joint P4 for example on a housing of the internal combustion engine 1. The control lever 8 is assigned a not shown actuator in order to pivot the control lever 8 by a desired angle about the joint P5. Between the joints P4 and P2 the transverse lever 6 is connected with the crankshaft 5 by a fourth joint P3. The joint P3 is connected with the crankpin 9 which is arranged spaced apart from the rotation axis 10 of the crankshaft 5 on the crankshaft 5.

During operation the crankshaft 5 rotates as indicated by an arrow 11, whereby the piston 3 is moved back and forth in the cylinder 2 in a translatory manner. By actuating or pivoting the control lever 8 about the joint P5, the angular conditions are changed so that the stroke of the piston 3 in the cylinder is changed, whereby the compression ratio of the internal combustion engine 1 is varied. In order to optimize the efficiency of the internal combustion engine 1, in particular with regard to the mechanical efficiency, it is provided that a particularly great lateral distance between the joint P5 and the rotation axis 10 of the crankshaft 5 is present. In the context of the present invention a distance to a joint always relates to the respective pivot axis of the corresponding joint.

In order to achieve smallest possible frictional forces in the joints P1 to P5, the dimensions of the transmission members of the connecting rod device 4 relative to the piston stroke are preferably selected to be as great as possible. This leads to smaller pivot angles of the joints P1 to P5 at same piston stroke and thus to a smaller friction. The increased required installation space can be compensated for example by a bent connecting rod 7 or a bent transverse lever 6 as shown, and by the thus improved better nestedness of crank drive and auxiliary aggregates. The larger transmission members create increased inertia forces at high rotational speeds, however even at high rotational speeds the decrease of the pivot angle and with the reduction of the friction outweigh the increased inertia forces.

According to a first advantageous exemplary embodiment A, the lateral distance x between the rotation axis 10 of the crankshaft 5 and the third joint in relation to the maximal stroke h of the piston 3 is −1.23 (x/h=−1.23). In the present exemplary embodiment a maximal piston stroke of h=92.8 mm is assumed. Further the horizontal distance y between the rotation axis 10 and the third joint P5 in relation to the piston stroke h is −0.65 (y/h=−0.65). It is further provided that the crankshaft radius r in relation to the maximal stroke h of the piston 3 is 0.34 (r/h=0.34). The distance a between the joints P5 and P4 in relation to the maximal stroke h of the piston 3 is 1.27 (a/h=1.27). the distance b between the joints P3 and P4 in relation to the maximal stroke h is 1.32 (b/h=1.32). The distance c between the joints P2 and P3 in relation to the maximal stroke h is 0.57 (c/h=0.57). Further the distance d between the joints P1 and P2 in relation to the maximal stroke h is 1.57 (d/h=1.57). The angled portion s in relation to the maximal stroke h of the piston 3 is 0.41 (s/h=0.41).

Figure 2:
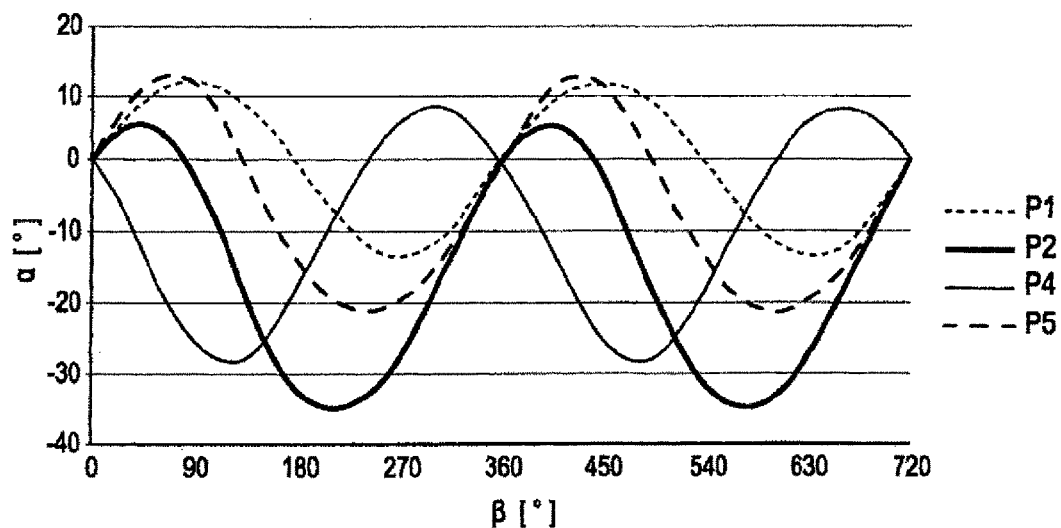

The described dimensional relationships achieve reduced friction and with this a higher efficiency of the internal combustion engine 1 in a simple manner. FIG. 2 shows in this context the pivot angles α of the joints P1, P2, P4 and P5 over a crankshaft rotation angle β. In FIG. 1 the pivot angle $α_{P4}$ of the joint P4 is shown as an example for explanation purposes.

According to a second exemplary embodiment B in particular the lateral distance between the joint P5 and the rotation axis 10 at same stroke h is increased. Hereby the following values result according to the second exemplary embodiment for the above mentioned parameters: the lateral distance x between the third joint P5 and the rotation axis 10 in relation to the stroke h is −1.78. The distance y remains the same. The crank radius r, i.e., the distance between the rotation axis 11 and the eccentric section 9 is 0.37. The angled portion s in relation to the stroke h is 0.47. Further the relationships a/h=1.74, b/h=0.62 and d/h=1.75 apply.

Figure 3:
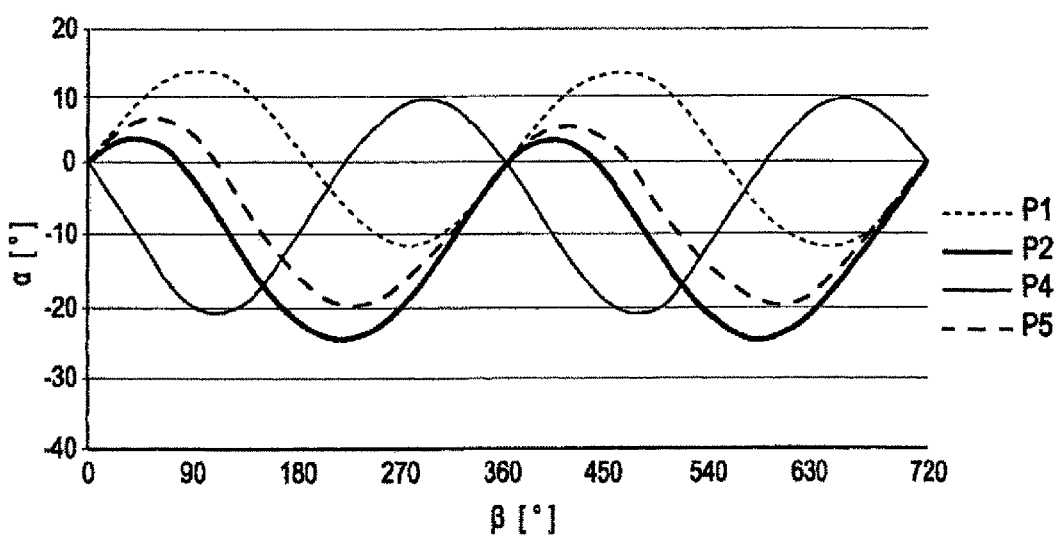

FIG. 3 shows analogous to FIG. 2 the resulting pivot angles α of the second exemplary embodiment over the crankshaft rotation angle β. The comparison with FIG. 2 shows hat the pivot angles of the joints P1, P2, P3 and P5 have changed.

Figure 4:
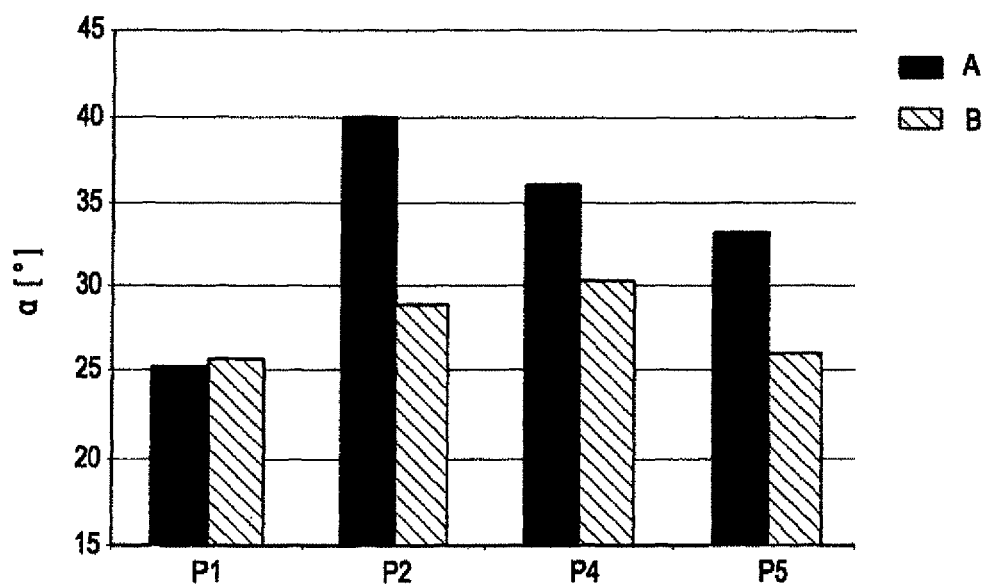

FIG. 4 shows in a comparison of the first exemplary embodiment A to the second exemplary embodiment B the pivot angle ranges of the joints P1, P2, P4 and P5.

Figure 5:
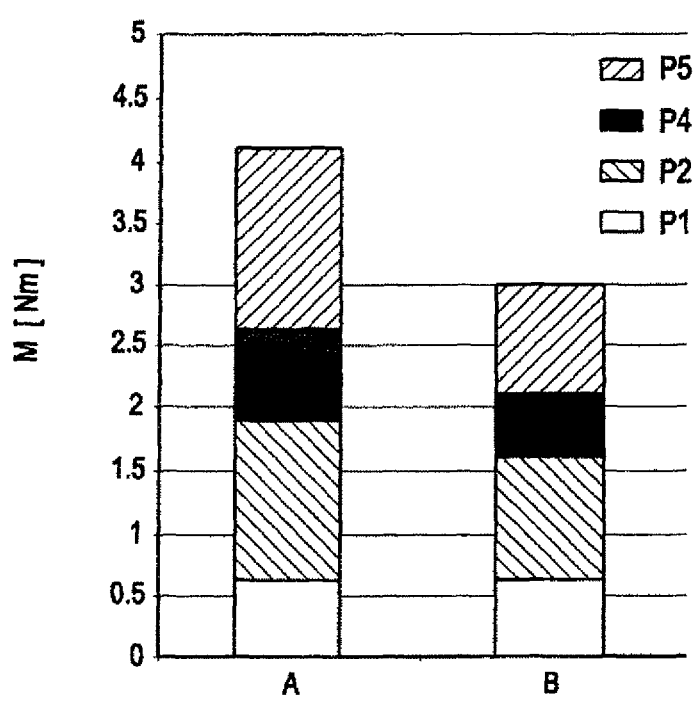

When applying the Coulomb's friction model and assuming that in both exemplary embodiments A and B identical joint forces occur as they are present under gas force at small rotational speeds, the smaller pivot angle range of the connecting rod device according to exemplary embodiment B generates significantly smaller friction moments as illustrated in FIG. 5, which shows the friction moments of the joints P1, P2, P4 and P5 for the two exemplary embodiments A and B. the multi-joint kinematic of the connecting rod device 4, which is configured friction-optimized in the oscillating pivot bearings or joints P1 to P5 due to the above selected values, thus leads to small pivot angles and with this to an optimized or reduced friction behavior in the joints P1 to P5.

Both exemplary embodiments A and B thus lead to an optimized efficiency of the internal combustion engine 1. The exemplary embodiment B leads to even further reduced friction forces in the joints compared to the exemplary embodiment A.

The invention claimed is:

1. An internal combustion engine comprising:
   at least one piston axially displaceable in a cylinder over a maximal stroke; and
   a connecting rod device for adjusting a compression of the internal combustion engine, said connecting rod device comprising a transverse lever having opposing ends and being connected on one of the opposing ends to a connecting rod via a first joint, and on the other one of the opposing ends being connected via a second joint with an actuatable control lever, said connecting rod being articulately arranged in the piston said control lever being arranged pivotal about a third joint, said transverse lever being connected between the first joint and the second joint with a crankpin of a crankshaft via a fourth joint, said crankpin being spaced apart from a rotation axis of the crankshaft, wherein a lateral distance between the rotation axis of the crankshaft and the third joint in relation to the maximal stroke of the piston is at least −1.0, in particular −1.23 or −1.78 so that pivot angles of the connecting rod device are reduced and as a result a friction in the joints is reduced.

2. The internal combustion engine of claim 1, wherein a distance of an eccentric section to the rotation axis in relation to the maximal stroke of the piston is at least 0.3, in particular 0.34 or 0.37.

3. The internal combustion engine of claim 1, wherein a horizontal distance between the rotation axis and the third joint in relation to the maximal stroke of the piston is at least −0.6, in particular −0.65.

4. The internal combustion engine of claim 1, wherein a distance between the second joint and the third joint in relation to the maximal stroke of the piston is at least 1.2, in particular 1.27 or 1.74.

5. The internal combustion engine of claim 1, wherein a distance between the fourth joint and the second joint in relation to the maximal stroke of the piston is at least 1.3, in particular 1.32 or 1.64.

6. The internal combustion engine of claim 1, wherein a distance between the first joint and the fourth joint in relation to the maximal stroke of the piston is at least 0.5, in particular 0.57 or 0.62.

7. The internal combustion engine of claim 1, wherein a distance between the first joint and the piston in relation to the maximal stroke of the piston is at least 1.5, in particular 1.57 or 1.75.

8. The internal combustion engine of claim 1, wherein a length of an angled portion of the transverse lever in relation to the maximal stroke of the piston is at least 0.3, in particular 0.41 or 0.47.

9. The internal combustion engine of claim 1, wherein the maximal stroke of the piston is at least 84 mm, in particular 92.8 mm.

* * * * *